United States Patent
Jakob

(10) Patent No.: US 6,730,718 B1
(45) Date of Patent: May 4, 2004

(54) DISCOLORATION-FAST DISPERSION ADHESIVES HAVING A PROLONGED POTLIFE

(75) Inventor: Martin Jakob, Kelkheim (DE)

(73) Assignee: Celanese Emulsions GmbH (DE)

( * ) Notice: Subject to any disclaimer, the term of this patent is extended or adjusted under 35 U.S.C. 154(b) by 5 days.

(21) Appl. No.: 10/110,406

(22) PCT Filed: Oct. 6, 2000

(86) PCT No.: PCT/EP00/09797

§ 371 (c)(1),
(2), (4) Date: Aug. 28, 2002

(87) PCT Pub. No.: WO01/27214

PCT Pub. Date: Apr. 19, 2001

(30) Foreign Application Priority Data

Oct. 13, 1999 (DE) .......................... 199 49 332

(51) Int. Cl.$^7$ .......................... C09J 11/04; C09J 11/06; C09J 123/26

(52) U.S. Cl. .......................... 523/201

(58) Field of Search .......................... 523/201

(56) References Cited

U.S. PATENT DOCUMENTS

| | | | |
|---|---|---|---|
| 3,563,851 A | 2/1971 | Armour et al. | |
| 4,118,357 A | 10/1978 | Brabetz et al. | |
| 4,405,747 A | 9/1983 | Ehmann et al. | |
| 4,544,689 A | 10/1985 | Ehmann et al. | |
| 4,647,504 A | 3/1987 | Kimimura et al. | |
| 4,657,957 A | 4/1987 | Baumann et al. | |
| 4,923,921 A | 5/1990 | Chevalier et al. | |
| 4,968,373 A | 11/1990 | Chevalier et al. | |
| 5,296,532 A | 3/1994 | Haerzschel et al. | |
| 5,545,684 A | 8/1996 | Jakob et al. | |
| 5,665,816 A | 9/1997 | Gerharz et al. | |
| 5,708,077 A | 1/1998 | Nolken et al. | |
| 5,747,578 A | 5/1998 | Schmitz et al. | |
| 5,763,508 A | 6/1998 | Hess et al. | |
| 5,777,015 A | 7/1998 | Jakob et al. | |
| 5,889,107 A | 3/1999 | Jakob et al. | |
| 5,907,011 A | 5/1999 | Jakob et al. | |
| 6,025,427 A | 2/2000 | Cabrera | |
| 6,093,766 A | 7/2000 | Jakob et al. | |
| 6,350,808 B1 | 2/2002 | Schmitz et al. | |

FOREIGN PATENT DOCUMENTS

| | | |
|---|---|---|
| DE | 22 61 402 | 7/1974 |
| DE | 26 20 738 | 12/1977 |
| DE | 39 42 628 | 6/1991 |
| DE | 196 49 419 | 6/1998 |
| EP | 0 413 136 | 2/1991 |
| EP | 0 686 682 | 12/1995 |
| GB | 1 440 337 | 6/1976 |

OTHER PUBLICATIONS

USPTO translation of DE 19649419A1 (Jun. 4, 1998) Schilling et al.*
English abstract for DE 19649419, Jun. 4, 1998.
U.S. Ser. No. 09/038,249, filed Mar. 11, 1998, Klein, et al.
U.S. Ser. No. 09/868,609, filed Jun. 18, 2001, Beyer, et al.
U.S. Ser. No. 09/889,822, filed Jul. 19, 2001, Hintz, et al.

* cited by examiner

*Primary Examiner*—Matthew A. Thexton
(74) *Attorney, Agent, or Firm*—Muserlian, Lucas and Mercanti

(57) ABSTRACT

The present invention relates to water-resistant aqueous dispersion adhesives with prolonged pot life and good color constancy of their bonds, comprising homopolymeric and/or copolymers polyvinyl esters, polymeric protective colloids, water-soluble compounds which can be complexed with the polymeric protective colloids, and derivatives of glyoxal and polyaldehydes having at least 3 carbon atoms, from which aldehyde groups can be controllably released in acidic media. The inventive dispersion adhesives are suitable for adhesively bonding porous and semiporous substrates.

27 Claims, No Drawings

DISCOLORATION-FAST DISPERSION ADHESIVES HAVING A PROLONGED POTLIFE

The present invention relates to water-resistant, polyvinyl ester-based, aqueous dispersion adhesives with a long pot life and good color constancy of their bonds on storage, to processes for preparing these dispersion adhesives, and to their use for bonding porous and semiporous substrates.

Polyvinyl ester dispersions, whose films exhibit increased water resistance, normally comprise reactive monomers or additives which decrease the hydrophilicity of the adhesive by crosslinking the polyvinyl alcohol which is used for stabilizing the dispersion. Crosslinking additives of high efficiency which are employed in water-resistant adhesive dispersions based on polyvinyl ester includes free aldehydes or their adducts with nucleophiles, which are able to undergo crosslinking reactions either inherently or, following removal of masking agents, by way of reactive aldehyde groups that have been released.

As crosslinking catalysts it is common to use hardener salts. Hardener salts disclosed by U.S. Pat. No. 3,563,851 and DE-C-26 20 738 include specific metal salts, examples being those of aluminum or those of transition group elements with the oxidation states III or IV.

DEB-22 61 402 describes water-resistant adhesive bonds based on a polyvinyl ester dispersion to which a urea-formaldehyde resin with crosslinking activity, in combination with a free organic or inorganic acid or an acidic metal salt, is admixed.

EP-A0 413 136 describes adhesives with cold water resistance based on polyvinyl alcohol and polyvinyl esters. Crosslinking adducts used include N-nucleophiles with glyoxal, examples being cyclic ureas or copolymerized reaction products of acrylamide. Through the addition of acidic metal salts, based preferably on aluminum, the water resistance can be improved.

EP-B-0 686 682 describes aqueous dispersion adhesives of increased water resistance, comprising homopolymeric or copolymeric polyvinyl esters, protective colloids, compounds which can be complexed with the protective colloids, and at least partly masked polyaldehydes having al least 3 carbon atoms which controlledly release aldehyde groups in acidic media. A subgroup of the complexible compounds is formed by metal salts, aluminum salts or zirconium salts for example. The resulting adhesives give rise advantageously to pale gluelines and satisfy relevant test standards, especially the DIN EN 204 durability classes D2 and D3 (cold water resistance) and DIN EN 204 D4 (hot water resistance). The pot lives following admixture of the ingredients are at least 8 hours.

For the end user of these adhesives, a long pot life, i.e., a slow increase in the viscosity of the dispersion following activation with the acidic metal salts, is fundamentally a desirable feature. Another desirable feature is high color constancy of the pale gluelines following application. The use of transition metal salts or aluminum salts as crosslinking catalysts has the disadvantage of a gradual darkening of the gluelines, caused by the reaction of the metal salts with polyvinyl alcohol or any substances contained in wood that may be present. The effect is observed on aging of the adhesive bond at room temperature, and is accelerated on exposure to heat.

One attempted solution to improving the discoloration of wood adhesive dispersions based on polyvinyl esters and comprising hardeners is described by DE-A-196 49 419. According to DE-A-196 49 419, the addition of low molecular mass polyvinyl alcohols having Höppler viscosities of from 2 to 6 mPa·s (measured in 4% strength aqueous solution) reduces the discoloration tendency in the case of cold water resistant adhesive bonds of durability class D3. A disadvantage is that the addition of sizable amounts of polyvinyl alcohol, which acts as a hydrophilicizing agent, decreases the hot water resistance of bonds.

The object accordingly was to provide polyvinyl ester dispersions for adhesives which possess a high, user-compatible pot life and whose adhesive bonds exhibit high color constancy with a high level of water resistance.

It has now surprisingly been found that aqueous dispersion adhesives comprising at least
- a) one homopolymeric and/or copolymeric polyvinyl ester,
- b) one polymeric protective colloid,
- c) one water-soluble compound which can be complexed with the polymeric protective colloids, and
- d) two, at least partly masked polyaldehydes which release aldehyde groups again in acidic media, wherein at least one masked polyaldehyde is a glyoxal derivative and at least one other masked polyaldehyde is a derivative of a polyaldehyde having at least 3 carbon atoms, feature a long, user-compatible pot life and a high level of water resistance and color constancy of their gluelines.

The polyaldehydes having at least 3 carbon atoms are aldehydes having a functionality of at least two.

Suitable monomeric units for the homopolymeric and copolymeric polyvinyl esters include preferably vinyl acetate, vinyl formate, vinyl propionate, vinyl isobutyrate, vinyl pivalate, vinyl 2-ethylhexanoate, vinyl esters of saturated, branched monocarboxylic acids having 9 to 10 carbon atoms in the acid radical, vinyl esters of relatively long-chain, saturated or unsaturated fatty acids such as, for example, vinyl laurate, vinyl stearate, and also vinyl esters of benzoic acid and/or substituted derivatives of benzoic acid such as, for example, vinyl p-tert-butylbenzoate. Vinyl acetate is of particularly preferred suitability.

The weight fraction of vinyl ester(s) in the copolymer of polyvinyl esters is preferably at least 50% by weight and with particular preference at least 75% by weight.

The copolymeric vinyl esters contain, where appropriate, as further monomer units
- a) up to 50% by weight, preferably up to 25% by weight, of one or more monomers from the following group: ethylene, $\alpha$-olefins having from 3 to 18 carbon atoms (e.g., propylene, butylene), styrene, vinyltoluene, vinylxylene, halogenated, unsaturated, aliphatic hydrocarbons (e.g., vinyl chloride, vinyl fluoride, vinylidene chloride, vinylidene fluoride) and/or
- b) up to 25% by weight, preferably between 1 and 5% by weight, of one or more monomers from the following group: $\alpha,\beta$-unsaturated acids (e.g., acrylic acid, methacrylic acid), esters of $\alpha,\beta$-unsaturated acids with primary or secondary, saturated, monohydric alcohols having from 1 to 18 carbon atoms (e.g., methanol, ethanol, propanol, butanol, 2-ethylhexanol, cycloaliphatic alcohols, and relatively long-chain fatty alcohols), $\alpha,\beta$-unsaturated dicarboxylic acids (e.g., maleic acid, fumaric acid, itaconic acid, citraconic acid), monoesters and/or diesters of $\alpha,\beta$-unsaturated dicarboxylic acids with saturated, monohydric, aliphatic alcohols having from 1 to 18 carbon atoms and/or
- c) up to 10% by weight, preferably up 2% by weight, of one or more monomers from the group consisting of polyethylenically unsaturated monomers, such as diallyl phthalate, diallyl maleate, triallyl cyanurate, tetraallyloxyethane, divinylbenzene, butan-1,4-diol dimethacrylate, triethylene glycol dimethacrylate, divinyl adipate, allyl (meth)acrylate, vinyl crotonate, methylenebisacrylamide, hexanediol diacrylate, pentaerythritol diacrylate, trimethylolpropane triacrylate and/or d) up to 15% by weight, preferably up to 10% by weight, of one or more nitrogen-containing monomers containing N-functional groups, such as (meth)acrylamide, allyl carbamate, acrylonitrile, N-methylol(meth)acrylamide, N-methylolallylcarbamate, N-methylol esters, N-methylol alkyl ethers or Mannich bases of N-methylol(meth)acrylamide or N-methylolallylcarbamate, acrylamidoglycolic acid, methyl acrylamidomethoxyacetate, N-(2,2-dimethoxy-1-hydroxyethyl)acrylamide, N-dimethylaminopropyl(meth)-acrylamide, N-methyl(meth)acrylamide, N-butyl(meth)acrylamide, N-cyclohexyl(meth)acrylamide, N-dodecyl(meth)acrylamide, N-benzyl(meth)acrylamide, p-hydroxyphenyl(meth)acrylamide, N-(3-hydroxy-2,2-dimethylpropyl)methacrylamide, ethyl imidazolidonylmethacrylate, N-vinylformamide, N-vinylpyrrolidone anchor e) up to 25% by weight, preferably up to 15% by weight, of one or more monomers from the group consisting of hydroxy-functional monomers, such as hydroxyethyl (meth)acrylate, hydroxypropyl (meth)acrylate or the adducts thereof with ethylene oxide or propylene oxide, and/or f) up to 10% by weight, preferably up to 5% by weight, of one or more monomers from the group consisting of monomers which are self-crosslinking and/or crosslinkable by way of carbonyl groups, such as diacetoneacrylamide, allyl acetoacetate, vinyl acetoacetate and acetoacetoxyethyl (meth)acrylate, for example.

Examples of suitable polymeric protective colloids include polyvinyl alcohols, copolymeric polyvinyl alcohols which carry carboxyl monomers, -ethylene and/or 1-methylvinyl alcohol units, polymer-analogous reaction products of polyvinyl alcohols, examples being those with diketene, etherified cellulose derivatives, such as hydroxyethylcellulose and carboxymethylcellulose, polyvinylpyrrolidone, polycarboxylic acids, such as polyacrylic acid, and/or copolymers, of maleic acid or of maleic anhydride with ethylenically unsaturated compounds, such as methyl vinyl ether, isobutylene or styrene, for example. Of preferred suitability as a protective colloid is polyvinyl alcohol with a degree of hydrolysis of from 60 to 100 mol %, with, particular preference having a degree of hydrolysis of from 70 to 98 mol %, and having viscosities of the 4% strength by weight aqueous solutions of from 2 to 70 mPas at 20° C.

The fraction of the polymeric protective colloids, based on the solids fraction, is preferably 1 to 25% by weight and with particular preference from 2 to 10% by weight.

Where appropriate, the adhesive dispersion may comprise nonionic and/or ionic emulsifiers, additives and/or auxiliaries. The fraction of emulsifiers, based on the polymer, is preferably up to 2% by weight. Examples of additives are film forming auxiliarities for lowering the MFT, plasticizers, defoamers, fillers, and preservatives. Auxiliaries which can be used include, for example, complexing agents based on polydentate ligands, such as ethylenediaminetetraacetic acid, for example, which form complexes with the water-soluble cations of the metal salts used and thereby improve the color constancy of the gluelines.

Suitable compounds which can be complexed with the polymeric protective colloids include water-soluble metal salts and salts and acids with oxoanions. Metal salts possessing preferred suitability are acidic metal salts with polyvalent complexible cations, such as are set out, for example, in DE-B-22 61 402, in DE-C-26 20 738, and in DE-A-39 42 628. Particularly suitable compounds are the water-soluble metal salts of Al(III) and Zr(IV), and especially aluminum chloride, aluminum nitrate, and zirconium oxychloride. Salts and acids with oxo anions that are of preferred suitability include those whose oxo anions are able to bind polyanions. Particularly suitable are borates and phosphates, and especially free boric acid and free phosphoric acid.

The glyoxal derivatives comprise adducts of glyoxal with S, O and/or N nucleophiles. Suitable adducts of S-nucleophiles are, for example, the bisulfite adducts, preferably those of sodium hydrogen sulfite or potassium hydrogen sulfite. Examples of suitable O-nucleophiles are aliphatic ($C_1$ to $C_{20}$) monoalcohols. Of preferred suitability are ($C_1$ to $C_{12}$) monoalcohols, such as methanol and ethanol, for example. Likewise suitable as O-nucleophiles are polyhydric alcohols, such as ethylene glycol, 1,2-propylene glycol, and 1,3-propylene glycol, for example. As an example of an adduct, mention may be made of 2,3-dihydroxy-1,4-dioxane. Examples of suitable N-nucleophiles include aliphatic monoamines, amides, and urea and cyclic ureas, such as ethyleneurea, for example. As an example of an adduct, mention may be made of 3,4-dihydroxyethyleneurea.

In the context of the invention, with regard to the masking of the glyoxal, hybrid forms of the abovementioned masking possibilities are of course also permissible.

The adhesive dispersions of the invention contain, based on the solid matter of the adhesive dispersion, preferably from 0.001 to 10% by weight, with particular preference from 0.01 to 5% by weight, and in particular from 0.1 to 2% by weight, of glyoxal derivatives.

Examples of polyaldehydes having at least 3 carbon atoms are malonaldehyde, succinaldehyde, glutaraldehyde, 2-hydroxyglutaraldehyde, β-methylglutaraldehyde, pimelaldehyd, suberaldehyde, malealdehyde and fumaraldehyde, sebacaldehyde, malaldehyde, phthalaldehyde, isophthalaldehyde, terephthalaldehyde, and ring-substituted aromatic aldehydes.

The derivatives of the polyaldehydes having at least 3 carbon atoms comprise adducts of the polyaldehydes with S, O and/or N nucleophiles. Preferred adducts are the bisulfite adducts. Particular preference is given to the glutaraldehyde bisalkali metal hydrogen sulfites. Preferred counterions of the bisulfite adducts are lithium, sodium, potassium, magnesium, calcium, aluminum, and ammonium ions and/or substituted ammonium ions.

Further inventively suitable derivatives of the polyaldehydes having at least 3 carbon atoms are their open-chain acetals with aliphatic ($C_1$–$C_{20}$) monoalcohols, preferably ($C_1$ to $C_{12}$) monoalcohols, especially methanol and ethanol, and their cyclic acetals with alcohols having a functionality of at least two, preferably ethylene glycol, 1,2-propylene glycol, and 1,3-propylene glycol. By way of example, mention may be made of chloromalonaldehyde bisdiethyl acetal, succinaldehyde mono- and bisdimethyl acetal, succinaldehyde bisdiethylacetal, 2-bromosuccinaldehyde bisdimethyl acetal, oximinosuccinaldehyde bisdimethyl acetal, and the bisdimethyl and bisdiethyl acetals of malealdehyde.

This group further embraces the intramolecular cyclic acetals of succinaldehyde and glutaraldehyde, such as 2,5-dimethoxytetrahydrofuran, 2,5-diethoxytetrahydrofuran, and 2,6-dimethoxy-tetrahydro-2H-pyran and 2,6-diethoxytetrahydro-2H-pyran. Particularly suitable compounds from this group are the bisdimethyl and bisdiethyl acetals of malonaldehyde and glutaraldehyde.

Further suitable derivatives of the polyaldehydes having a least 3 carbon atoms are their enol ethers, enol esters, acylates, and mixed acylate ethers. Among these compounds, there exist those which contain aldehyde groups which for constitutional reasons are predominantly in the enol form, an example being hydroxypyruvaldehyde (reductone). These, and also reaction products of the enols in which the residual aldehyde groups not present in the enol form may also have been masked, are likewise suitable derivatives.

Derivatives of the polyaldehydes having at least 3 carbon atoms that are likewise suitable in accordance with the invention are the cleavable reaction products of the polyaldehydes with nitrogen compounds. These derivatives include the oximes, oxime esters, oxime ethers, imines (Schiff bases), enamines, aminals, hydrazones, semicarbazones, anils, diurethanes and enamine urethanes of polyfunctional aldehydes. Examples which may be mentioned include glutaraldehyde dioxime, phthalaldehyde monoxime and dioxime, phthalaldehyde oxime semicarbazone, isophthalaldoxime, terephthalaldoxime, terephthalaldehyde dihydrazone, and the anils of malonaldehyde, succinaldehyde, and glutaraldehyde.

In the context of the invention, with regard to the masking of the polyaldehydes having at least 3 carbon atoms, hybrid forms of the abovementioned masking possibilities are of course also permissible.

The adhesive dispersions of the invention contain, based on the solid matter of the adhesive dispersion, preferably from 0.001 to 10% by weight, with particular preference from 0.01 to 5% by weight, and in particular from 0.1 to 2% by weight, of derivatives of the polyaldehydes having at least 3 carbon atoms.

The adhesive dispersions of the invention possess a pH at which the derivatives of the polyaldehydes having at least 3 carbon atoms and, where appropriate, the derivatives of glyoxal are hydrolyzed and the aldehyde groups are controlledly released. This pH range is situated preferably between 2 and 6, with particular preference between 2.5 and 4. In order to adjust the pH, organic and/or inorganic Lewis and Brönsted acids are added where appropriate. Brönsted acids of preferred suitability have a $pK_a$ of <2.5, such as, for example, phosphoric acid, hydrochloric acid, sulfuric acid, nitric acid, perchloric acid, and p-toluenesulfonic acid. The particularly preferred Brönsted acid is phosphoric acid. Lewis acids of preferred suitability are the acidic salts of complexible metal ions. Particularly preferred Lewis acids are aluminum chloride, aluminum nitrate, and zirconium oxychloride.

In two-component systems, the adhesive is preferably activated by adding the acidic complexible compounds.

The solids content of the adhesive dispersion of the invention is preferably from 20 to 65% by weight, with particular preference from 30 to 60% by weight.

The present invention also provides a process for preparing the dispersion adhesives of the invention, wherein a mixture is prepared in the form of a formulated polyvinyl ester dispersion comprising as constituents at least a) one homopolymeric and/or copolymeric polyvinyl ester, b) one polymeric protective colloid, c) one compound which can be complexed with the polymeric protective colloids, and d) two, at least partly masked polyaldehydes which release aldehyde groups again in acidic media, in which at least one masked polyaldehyde is a glyoxal derivative and at least one other masked polyaldehyde is a derivative of a polyaldehyde having at least 3 carbon atoms, and subsequently, where necessary, adjusting the pH by adding Lewis and/or Brönsted acids.

The preparation of the adhesive of the invention may comprise the preparation of polyvinyl ester dispersions which comprise the constituent a), a portion, preferably the entirety, of the polymeric protective colloids b) and, where appropriate, emulsifiers, acids such as filming assistants, etc., and/or auxiliaries.

The polyvinyl ester dispersions may be prepared by means of customary continuous or batchwise processes of free-radical emulsion polymerization. In these processes, water-soluble and/or oil-soluble initiator systems such as peroxodisulfates, azo compounds, hydrogen peroxide, organic hydroperoxides or dibenzoyl peroxide are employed. These may be used either by themselves or in combination with reducing compounds such as Fe(II) salts, sodium pyrosulfite, sodium hydrogen sulfite, sodium sulfite, sodium dithionite, sodium formaldehyde-sulfoxylate, ascorbic acid, as a redox catalyst system. The polymeric protective colloids and, where appropriate, the emulsifiers, additives and/or auxiliaries may be added before, during or after the polymerization.

In one preferred embodiment for a two-component or multicomponent adhesive, as a first component first of all a mixture is prepared comprising the constituents a), b), c), and, where appropriate, emulsifiers, additives and/or auxiliaries. Subsequently the masked polyaldehydes d), comprising the glyoxal derivatives and the derivates of the polyaldehydes having at least 3 carbon atoms, are added together or separately to the mixture.

In one variant of this embodiment, first of all a mixture is prepared comprising the constituents a), b), c), the glyoxal derivatives, and, where appropriate, emulsifiers, additives and/or auxiliaries. Subsequently the derivatives of the polyaldehydes having at least 3 carbon atoms are added as a further component to the mixture.

In one further preferred embodiment for a two-component or multicomponent adhesive, first of all a mixture is prepared comprising the constituents a), b), d), and, where appropriate, emulsifiers, additives and/or auxiliaries. Subsequently the mixture is activated by adding the compounds c) which can be complexed with the polymeric protective colloids. Activating compounds used are preferably aqueous solutions containing aluminum chloride, aluminum nitrate and/or zirconium oxychloride. The mixture ought to possess as far as possible a neutral pH, but at least a pH of 6, before the complexing compounds are added, since in that case there is only very slow hydrolysis, if any, of the masked polyaldehydes, and this enhances the service life of the unactivated adhesive. For this purpose, the pH of the mixture may also be adjusted subsequently by adding customary neutralizing agents.

The glyoxal derivatives and the derivatives of the polyaldehydes having at least 3 carbon atoms may be added as solids or in the form solutions. Examples of suitable solutions include aqueous solutions or solutions in aliphatic alcohols. The addition lakes place preferably in the form of a concentrated, aqueous solution, since in that case the drop in viscosity in the dispersion is minimized.

The preparation of the activated adhesive system may of course also be followed, where necessary, by further formulation—for example, by the addition of auxiliaries, such as defoamers, or the addition of further polymeric protective colloids, such as polyvinyl alcohol, etc., in order to prolong the open time. These procedures are known in principle to the skilled worker.

The invention further provides for the use of the dispersion adhesives of the invention for adhesively bonding porous and semiporous substrates. Preferred substrates are wood, paper, cardboard, corrugated cardboard, foam materials, cement, leather, textiles or laminates.

The adhesive preparations of the invention are particularly suitable as adhesives for cellulosic substrates such as wood and paper. The adhesives are suitable for manual or machine application, and also, owing to the color neutrality of the bonds, particularly for applications where the bond lines are cured by means of high-frequency alternating fields. One specific field of application is the production of window frames, and also veneer gluing.

More specific applications of the adhesive dispersions of the invention lie in adhesives and binders for the architectural, domestic, and textile sectors, such as flooring, wall, and ceiling adhesives, furniture film adhesives and carpet backing adhesives, binders for wood fiberboard and reconstituted leather, binders for insulating materials made from paper fibers or polymer fibers, binders for acid-resistant minerals in architectural dispersions, and binders for textiles and nonwovens. Use as an adhesive and/or binder in textile printing and as a textile finish is likewise possible.

In comparison with the adhesive dispersions described in the prior art, the adhesive dispersions of the invention have prolonged pot lives, or slower increases in viscosity, with improved color constancy and a comparably high level of glueline. water resistance. The adhesive bonds satisfy the requirements of the test standard DIN EN 204 for classification in at least durability class D2, preferably durability class D3, and in particular durability class D4.

It should also be emphasized that the dispersion adhesives of the invention are, advantageously, systems which are isocyanate-free and to a substantial extent also formaldehyde-free. Especially in dispersions which include constituents which give off formaldehyde, the particularly preferred hydrogen sulfite adducts of glyoxal and also the polyaldehydes having at least 3 carbon atoms afford the further advantage, moreover, that the hydrogen sulfite released on crosslinking acts as a formaldehyde scavenger and so markedly decreases the concentration of free formaldehyde in the adhesives or binders.

Test Methods Used:

1. Determination of the Pot Life:

In the absence of numerical viscosity figures, this means a time period within which the adhesive dispersion in the formulated end form (with metal salt and crosslinking agent) were still reliably flowable with a viscosity (to be checked daily) of $\leq 40$ Pa·s according to Brookfield RVT 6/20.

2. Determination of the Bond Strengths:

The bond strengths (tensile strengths) were determined on beech wood test specimens following boiling water treatment in accordance with the test standard DIN EN 204/D4. The test specimens were produced in accordance with the procedure of DIN EN 205. Gluing and testing were conducted while observing the following parameters:

| | |
|---|---|
| Maturation time following addition of hardener | 2 hours |
| Glue application | 150 ± 20 g/m², both sides |
| Open waiting time | 3 minutes |
| Closed waiting time | 2 hours |
| Pressing time | 2 hours |
| Pressing pressure | 0.7 ± 0.1 N/mm² |
| Number of test specimens per test series | 20 |
| Testing of the storage series in accordance with DIN EN 204 D4/5 | 7 days of standard conditions (23 ± 2° C. and 50 ± 5% relative humidity) 6 hours in boiling water 2 hours in cold water |
| Test temperature | 23 ± 2° C. |
| Advance rate | 50 mm/min |

Classification in durability class D4/5 was made for a bond strength (tensile strength) of at least 4 N/mm².

3. Determination of the discoloration on oak

The adhesive dispersions were applied to oak in a wet application of 800 μm using a box-type coating bar and then were placed in this form in a heated drying oven at 90° C. After 45 minutes, the dried films were removed and the discoloration assessed visually.

The examples below serve to illustrate the invention without restricting it. The parts and percentages indicated in the examples relate to the weight unless noted otherwise. The comparative adhesives were adhesives in acordance with EP-B-0 686 682.

EXAMPLE 1

Preparation of an Inventive Adhesive 1 and of a Comparative Adhesive 1

In a glass stirred tank reactor with anchor stirrer, equipped with feed facilities, reflux condenser, jacket heating and jacket cooling, a polyvinyl acetate homopolymer dispersion containing 100 parts of polyvinyl acetate was prepared using 5 parts of Mowiol® 18–88 (Clariant GmbH, partially hydrolyzed polyvinyl alcohol with degree of hydrolysis of 88 mol %) as protective colloid and 0.1 part of hydrogen peroxide as initiator. A metering technique was employed, with 4.2 parts of vinyl acetate being introduced as initial charge and 95.8 parts of vinyl acetate metered in over the course of 3 hours at a polymerization temperature of 70 to 74° C. After the end of polymerization, 0.17 part of sodium acetate was added. This gave a coagulum-free dispersion having a pH of 3.8, a solids content of 50% by weight, a monomeric vinyl acetate content of 0.4%, and a viscosity of 48.8 Pa·s (measurement system: Brookfield 6/20, 23° C.). Thereafter, 2% of butyl diglycol acetate was added to the dispersion in order to lower the MFT, and 5% of a saturated solution of aluminum chloride hexahydrate was added to the dispersion.

In case of the inventive adhesive 1, the above dispersion was subsequently admixed with aqueous solutions of commercial glutaraldehyde bis-sodium hydrogen sulfite (GABNA) and commercial glyoxal bis-sodium hydrogen sulfite monohydrate (GLYBNA). In the case of the comparative adhesive 1, the dispersion was subsequently admixed only with an aqueous solution of commercial glutaraldehyde bis-sodium hydrogen sulfite (GABNA). The initial viscosity of the two adhesives was in each case 7 Pa·s (Brookfield 6/20, 23° C.). Table 1 indicates the composition of the adhesives. Likewise indicated in Table 1 are the pot lives and the bond strengths of the adhesives in accordance with DIN EN 204.

TABLE 1

Compositions, pot lives and bond strengths of the inventive adhesive 1 and of the comparative adhesive 1 in accordance with DIN EN 204

|  | Inventive adhesive 1 | Comparative adhesive 1 (as per EP-B-0 686 682) |
|---|---|---|
| Parts of Dispersion | 100 | 100 |
| Parts of GABNA | 0.5 | 0.5 |
| Parts of GLYBNA | 0.5 | — |
| Parts of water | 4 | 4 |
| Pot life/days | >3 days | 1 day |
| D4/5 N/mm$^2$ | 4.2 | 4.0 |

Table 1 shows that the inventive adhesive 1, with a hot water resistance comparable with that of the comparative adhesive 1, has a markedly prolonged pot life.

EXAMPLE 2

Preparation of an Inventive Adhesive 2 and of a Comparative Adhesive 2

100 parts of Mowilith® D, approximately 50% (polyvinyl alcohol-stabilized polyvinyl acetate homopolymer dispersion, Clariant GmbH) were admixed with 2.2 parts of a saturated solution of aluminum chloride hexahydrate, giving a pH of 3. To prepare the inventive adhesive 2, aqueous solutions of commercial glutaraldehyde bis-sodium hydrogen sulfite (GABNA) and commercial glyoxal bis-sodium hydrogen sulfite monohydrate (GLYBNA) were subsequently added. To prepare the comparative adhesive 2, only an aqueous solution of commercial glutaraldehyde bis-sodium hydrogen sulfite (GABNA) was added. Both adhesives possessed an initial viscosity of 7 Pa·s (Brookfield 6/20, 23° C.). The compositions of the inventive adhesive 2 and the comparative adhesive 2 are indicated in Table 2. The inventive adhesive 2 and the comparative adhesive 2 were subjected in accordance with DIN EN 204 to a determination of the bond strength, to a determination of the discoloration on oak, and to the determination of the viscosity as a function of time. The results are set out in Table 2 and Table 3.

TABLE 2

Compositions, pot lives, bond strengths to DIN EN 204, and discoloration on oak of the inventive adhesive 2 and of the comparative adhesive 2

|  | Inventive adhesive 2 | Comparative adhesive 2 (as per EP-B-0 686 682) |
|---|---|---|
| Parts of Dispersion | 102.2 | 102.2 |
| GABNA | 0.67 | 0.67 |
| GLYBNA | 0.5 | — |
| Water | 6.25 | 6.25 |
| D4/5 N/mm$^2$ | 4.2 | 4.3 |
| Discoloration on oak | almost colorless | light brown discoloration |

TABLE 3

Viscosity change (measurement system Brookfield 6/20) of the inventive adhesive 2 and of the comparative adhesive 2 as a function of time at 23° C.

| Time (days) | Viscosity of the inventive adhesive 2 (Pa*s) | Viscosity of the comparative adhesive 2 (as per EP-B-0 686 682) (Pa*s) |
|---|---|---|
| 0 | 7.1 | 7.1 |
| 1 | 7.4 | 9.7 |
| 2 | 9.1 | 14.7 |
| 3 | 10.8 | 20.0 |
| 5 | 12.6 | 28.6 |
| 7 | 22.0 | 42.0 |

Example 2 shows that, as compared with the comparative adhesive 2, the inventive adhesive 2 has a comparably high level of hot water resistance while exhibiting a slower viscosity increase and more favorable discoloration characteristics on oak.

What is claimed is:

1. An aqueous dispersion adhesive comprising:
   a) at least one homopolymeric and/or copolymeric polyvinyl ester,
   b) at least one polymeric protective colloid,
   c) at least one water-soluble compound which can be complexed with the at least one polymeric protective colloid, and
   d) at least two, at least partly masked polyaldehydes which release aldehyde groups in acidic media, wherein at least one masked polyaldehyde is a glyoxal derivative and at least one other masked polyaldehyde is a derivative of a polyaldehyde having at least 3 carbon atoms.

2. The dispersion adhesive as claimed in claim 1, wherein the homopolymeric and copolymeric polyvinyl esters comprise as monomer units vinyl acetate, vinyl formate, vinyl propionate, vinyl isobutyrate, vinyl pivalate, vinyl 2-ethylhexanoate, vinyl esters of saturated, branched monocarboxylic acids having 9 to 10 carbon atoms in the acid radical, vinyl esters of relatively long-chain, saturated or unsaturated fatty acids, vinyl esters of benzoic acid and/or vinyl esters of substituted derivatives of benzoic acid.

3. The dispersion adhesive as claimed in claim 1, wherein the homopolymeric and copolymeric polyvinyl esters comprise vinyl acetate as monomer units.

4. The dispersion adhesive as claimed in claim 1, wherein the weight fraction of vinyl ester(s) in the copolymeric polyvinyl esters is at least 50% by weight.

5. The dispersion adhesive as claimed in claim 1, wherein the copolymeric polyvinyl esters comprise as monomer units
   a) up to 50% by weight of one or more monomers selected from the group consisting of: ethylene, α-olefins having from 3 to 18 carbon atoms, styrene, vinyltoluene, vinylxylene, halogenated, unsaturated, and aliphatic hydrocarbons and/or b) up to 25% by weight of one or more monomers selected from the group consisting of: α,β-unsaturated acids, esters of α,βunsaturated acids with primary or secondary, saturated, monohydric alcohols having from 1 to 18 carbon atoms, α,β-unsaturated dicarboxylic acids, and monoesters and/or diesters of α,β-unsaturated dicarboxylic acids with saturated, monohydric, aliphatic alcohols having from 1 to 18 carbon atoms and/or
   c) up to 10% by weight of one or more monomers from polyethylenically unsaturated monomers and/or d) up to 15% by weight of one or more nitrogen-containing monomers containing N-functional groups and/or e) up to 25% by weight of one or more monomers containing hydroxy-functional groups and/or f) up to 10% by weight of one or more monomers selected from the group consisting of monomers which are self-crosslinking and monomers which are crosslinkable by way of carbonyl groups.

6. The dispersion adhesive as claimed in claim 1, wherein the at least one polymeric protective colloid is selected from the group consisting of polyvinyl alcohols, copolymeric polyvinyl alcohols which carry carboxyl monomers, -ethylene and/or 1methylvinyl alcohol units, polymer-analogous reaction products of polyvinyl alcohols, etherified cellulose derivatives, polyvinylpyrrolidone, polycarboxylic acids and copolymers of maleic acid or of maleic anhydride with ethylenically unsaturated compounds.

7. The dispersion adhesive as claimed in claim 1, containing from 1 to 25% by weight, based on the solids fraction, of at least one polymeric protective colloid.

8. The dispersion adhesive as claimed in claim 1, wherein the at least one water soluble compound compounds which can be complexed with the polymeric protective colloid is selected from the group consisting of water-soluble metal salts, salts with oxoanions and acids with oxoanions.

9. The dispersion adhesive as claimed in claim 8, wherein the water-soluble metal salts are salts of Al(III) and Zr(IV) and wherein the oxoanions are borates and phosphates.

10. The dispersion adhesive as claimed in claim 1, wherein the glyoxal derivative is an adduct of glyoxal with S, O and/or N nucleophiles.

11. The dispersion adhesive as claimed in claim 10, wherein the S nucleophiles are adducts with sodium hydrogen sulfite and/or potassium hydrogen sulfite, wherein the O nucleophiles are adducts with aliphatic ($C_1$ to $C_{20}$) monoalcohols and/or monohydric alcohols, and wherein the N nucleophiles are aliphatic monoamines, amides, urea and/or cyclic ureas.

12. The dispersion adhesive as claimed in claim 1, containing from 0.001 to 10% by weight, based on the solid matter, of the glyoxal derivative.

13. The dispersion adhesive as claimed in claim 1, wherein the derivative of a polyaldehyde having at least 3 carbon atoms is selected from the group consisting of malonaldehyde, succinaldehyde, glutaraldehyde, 2-hydroxyglutaraldehyde, βmethylglutaraldehyde, pimelaldehyd, suberaldehyde, malealdehyde and fumaraldehyde, sebacaldehyde, malaldehyde, phthalaldehyde, isophthalaldehyde, terephthalaldehyde, and ring-substituted derivatives of aromatic aldehydes.

14. The dispersion adhesive as claimed in claim 1, wherein the derivative of a polyaldehyde having at least 3 carbon atoms comprises adducts of polyaldehydes with S, O and/or N nucleophiles.

15. The dispersion adhesive as claimed in claim 14, wherein the derivative of a polyaldehyde having at least 3 carbon atoms is selected from the group consisting of bisulfite adducts, open-chain acetals, cyclic acetals, enol ethers, enol esters, acylates, mixed acylate ethers, oximes, oxime esters, oxime ethers, imines (Schiff bases), enamines, aminals, hydrazones, semicarbazones, anils, diurethanes and enamine urethanes.

16. The dispersion adhesive as claimed in claim 15, wherein the bisulfite adducts are the glutaraldehyde bis-alkali metal hydrogen sulfites.

17. The dispersion adhesive as claimed in claim 1, containing from 0.001 to 10% by weight, based on the solid matter, of the derivative of a polyaldehyde having at least 3 carbon atoms.

18. The dispersion adhesive as claimed in claim 1, possessing a pH in the range from 2 to 6.

19. A window frame adhesive comprising the dispersion adhesive as claimed in claim 1.

20. A binder for textiles and nonwovens comprising the dispersion adhesive as claimed in claim 1.

21. A veneer glue comprising the dispersion adhesive as claimed in claim 1.

22. A bonding composition for bonding substrates comprising the dispersion adhesive as claimed in claim 1.

23. A process for preparing a dispersion adhesive comprising the step of preparing a mixture in the form of a formulated polyvinyl ester dispersion, wherein the formulated polyvinyl ester dispersion includes:

a) at least one homopolymeric and/or copolymeric polyvinyl ester, b) at least one polymeric protective colloid, c) at least one compound which can be complexed with the polymeric protective colloid, and d) at least two, at least partly masked polyaldehydes which release aldehyde groups again in acidic media, in which at least one masked polyaldehyde is a glyoxal derivative and at least one other masked polyaldehyde is a derivative of a polyaldehyde having at least 3 carbon atoms.

24. The process as claimed in claim 23, wherein the preparing step further comprises mixing constituents a), b), and c), and subsequently adding constituent d) to constituents a), b), and c).

25. The process as claimed in claim 23, wherein the preparing step further comprises mixing the constituents a, b), c) and, and the glyoxal derivative, and subsequently adding the derivative of the polyaldehyde having at least 3 carbon atoms to the constituents a), b), c), and the glyoxal derivative.

26. The process as claimed in claim 23, wherein the preparing step further comprises mixing the constituents a), b), and d), and subsequently activating the polyvinyl ester dispersion by adding constituent c) to constituents a), b), and d).

27. The process as claimed in claim 23, further comprising the step of adjusting the pH of the mixture by adding Lewis and/or Brönsted acids.

* * * * *